United States Patent
Aimone et al.

(10) Patent No.: US 11,814,312 B2
(45) Date of Patent: *Nov. 14, 2023

(54) CORROSION-RESISTANT GLASS MELT ELECTRODES AND METHODS OF USING THEM

(71) Applicants: Paul Aimone, Bridgewater, MA (US); WenDi Liu, Worcester, MA (US); Maria Bozena Winnicka, Euclid, OH (US); Francois-Charles Dary, Boston, MA (US)

(72) Inventors: Paul Aimone, Bridgewater, MA (US); WenDi Liu, Worcester, MA (US); Maria Bozena Winnicka, Euclid, OH (US); Francois-Charles Dary, Boston, MA (US)

(73) Assignee: H.C. Starck Solutions Coldwater, LLC, Coldwater, MI (US)

( * ) Notice: Subject to any disclaimer, the term of this patent is extended or adjusted under 35 U.S.C. 154(b) by 578 days.

This patent is subject to a terminal disclaimer.

(21) Appl. No.: 16/797,537

(22) Filed: Feb. 21, 2020

(65) Prior Publication Data

US 2020/0262730 A1  Aug. 20, 2020

Related U.S. Application Data

(63) Continuation of application No. 14/872,512, filed on Oct. 1, 2015, now Pat. No. 10,604,434.

(60) Provisional application No. 62/058,259, filed on Oct. 1, 2014.

(51) Int. Cl.
C03B 5/027 (2006.01)
C03B 5/167 (2006.01)
C03B 5/185 (2006.01)
H05B 3/03 (2006.01)

(52) U.S. Cl.
CPC ............ *C03B 5/027* (2013.01); *C03B 5/1672* (2013.01); *C03B 5/1675* (2013.01); *C03B 5/185* (2013.01); *H05B 3/03* (2013.01)

(58) Field of Classification Search
CPC ..... C03B 5/027; C03B 5/1672; C03B 5/1675; C03B 5/185; H05B 3/03; H05B 3/10; H05B 2203/025; H05B 7/10; H05B 7/12
USPC ......................................................... 373/37
See application file for complete search history.

(56) References Cited

U.S. PATENT DOCUMENTS

| | | |
|---|---|---|
| 2,693,498 A | 11/1954 | Penberthy |
| 2,843,644 A | 7/1958 | Hann |
| 2,908,738 A | 10/1959 | Rough |
| 3,375,314 A | 3/1968 | Sinner |
| 3,412,194 A | 11/1968 | Pipitz et al. |
| 3,531,275 A | 9/1970 | Venanzio et al. |
| 3,651,238 A | 3/1972 | Schlienger |
| 3,777,040 A | 12/1973 | Gell et al. |
| 4,107,450 A | 8/1978 | Costin |
| 4,514,851 A | 4/1985 | Dunn |
| 4,638,491 A | 1/1987 | Perkins |
| 4,668,262 A | 5/1987 | Kithany |
| 4,965,812 A | 10/1990 | Sorg et al. |
| 6,090,227 A | 7/2000 | Liechtfried et al. |
| 8,743,926 B2 | 6/2014 | Hirt et al. |
| 2005/0286604 A1 | 12/2005 | Rott |

(Continued)

*Primary Examiner* — Dana Ross
*Assistant Examiner* — Joe E Mills, Jr.
(74) *Attorney, Agent, or Firm* — Morgan, Lewis & Bockius LLP

(57) ABSTRACT

In various embodiments, refractory-metal glass melt electrodes are single-crystalline, at least within an outer layer thereof.

20 Claims, 6 Drawing Sheets

(56) References Cited

U.S. PATENT DOCUMENTS

2012/0039352 A1    2/2012   Hirt et al.
2016/0096763 A1    4/2016   Aimone et al.

CORROSION-RESISTANT GLASS MELT ELECTRODES AND METHODS OF USING THEM

RELATED APPLICATIONS

This application is a continuation of U.S. patent application Ser. No. 14/872,512, filed Oct. 1, 2015, which claims the benefit of and priority to U.S. Provisional Patent Application No. 62/058,259, filed Oct. 1, 2014, the entire disclosure of which is hereby incorporated herein by reference.

TECHNICAL FIELD

In various embodiments, the present invention relates to electrodes utilized for glass melting, in particular to such electrodes exhibiting enhanced corrosion resistance.

BACKGROUND

Glass is typically processed by batch heating and refining within a melting furnace. Glass batches are typically heated via burners, which serve as the primary heat source, and from glass melt electrodes embedded in the wall of the melting furnace. The number of electrodes depends upon the size of the melting furnace and the characteristics of the glass being processed. These glass melt electrodes introduce additional thermal energy into the furnace by passing a current through the glass melt. Due to the extremely high temperatures required for glass melting (typically between approximately 1100° C. and approximately 1700° C.), glass melt electrodes are typically formed of refractory metals, such as molybdenum (Mo) or tungsten (W), or alloys thereof. However, molten glass is often extremely corrosive and oxidative, and even such refractory metals may corrode and degrade after long periods of use.

Conventional electrodes are polycrystalline and typically have grain sizes no greater than 100 microns. One primary corrosion mode in conventional electrodes is corrosive attack on the refractory metal along the crystalline grain boundaries thereof. Due to the increased interatomic disorder and free volume at grain boundaries, corrosive elements (particularly polyvalent elements such as Pb, As, Sb, Co, Ni, or Mn) from the glass melt diffuse more quickly into the melt electrode at the grain boundaries, leading to increased corrosion. This effect may be mitigated somewhat by the incorporation of alloying elements (e.g., Si, B, Pd, Pt, Ir, or Ru) within the electrode material, as the alloying elements tend to preferentially accumulate at the grain boundaries and retard grain-boundary diffusion and related corrosive attack. However, such alloying elements may be quite expensive and may also diminish the mechanical processability of the electrode material, making electrode formation more time-consuming and expensive. In some cases, the alloying elements may deleteriously contaminate the molten glass itself. Such considerations limit the amount of alloying elements that may be added to the electrode material, and thus grain boundary diffusion (and concomitant corrosion) typically still occurs in conventional electrodes.

In view of the foregoing, there is a need for improved glass melt electrodes that resist corrosion but remain amenable to mechanical processing.

SUMMARY

In accordance with various embodiments of the present invention, glass melt electrodes are composed of a single-crystal refractory metal (such as Mo), at least in their outer surface layers. While the entire electrode may be single crystalline, in some embodiments, the single-crystal outer surface layer surrounds a polycrystalline core containing a network of grain boundaries that does not penetrate into or through the outer surface layer. The grain boundaries present within such a polycrystalline core may provide the electrode with increased resistance to creep, particularly at the extreme temperatures utilized in the glass melt furnace.

Glass melt electrodes in accordance with embodiments of the present invention may include, consist essentially, or consist of one or more refractory metals such as Mo or W. In various embodiments of the invention, the glass melt electrodes are substantially free of (i.e., free of except for any present as unintentional impurities) of alloying elements that tend to accumulate at grain boundaries (e.g., Si, B, Pd, Pt, Ir, and/or Ru). The glass melt electrodes may also be substantially free of elements such as calcium and/or magnesium. In some embodiments, the glass melt electrodes are coated with a corrosion-resistant coating. For example, the coating may retard bulk oxidation of the electrode material. The coating may include, consist essentially of, or consist of, for example, MoSiB, MoZrO$_2$, or SiBC. Typically, the elements of the coating remain at the surface of the electrode but do not appreciably diffuse into the bulk of the electrode. Beneficially, the single-crystal outer surface layer of electrodes in accordance with embodiments of the invention retards or substantially prevents attack on and/or detachment of the coating. In conventional coated electrodes, corrosive species from the melt may penetrate through small gaps or microcracks in the coating and diffuse along grain boundaries at the electrode/coating interface, resulting in corrosion and further loss of integrity of the coating. In electrodes in accordance with embodiments of the present invention, no such grain boundaries are present on the outer surface layer, thereby maximizing the useful lifetime of the corrosion-resistant coating and the electrode itself.

In additional embodiments of the present invention, at least the outer surface layer of the glass melt electrode is composed of a plurality of large grains, i.e., grains each having a grain size of at least 1 mm, at least 5 mm, or even at least 10 mm. The large grain size vastly reduces the grain-boundary density in at least the outer surface layer of the electrodes, thereby substantially reducing any corrosion therealong. As described herein for single-crystal electrodes, the large-grain electrodes may be coated with a corrosion-resistant coating.

In an aspect, embodiments of the invention feature a glass melt electrode that includes, consists essentially of, or consists of a base sized and shaped for engagement with an interior surface of a glass-melting furnace, and an elongated shaft extending from the base. At least an outer surface layer of the shaft is single-crystalline. At least the outer surface layer of the shaft includes, consists essentially of, or consists of one or more refractory metals.

Embodiments of the invention may include one or more of the following in any of a variety of combinations. At least an outer surface layer of the base may be single-crystalline. The outer surface layer of the base may be disposed around a non-single-crystalline (e.g., polycrystalline or amorphous) core. The entire volume of the base may be single-crystalline. The base may include, consist essentially of, or consist of one or more refractory metals that are the same as or different than the one or more refractory metals of the outer surface layer of the shaft. The base and the shaft may be portions of a seamless unitary structure. The outer surface layer (or even the entire volume) of the shaft and/or the base may be substantially free of grain boundaries. The one or more refractory metals may include, consist essentially of, or consist of Mo and/or W. The one or more refractory metals may include, consist essentially of, or consist of Nb, Ta, and/or Re. The one or more refractory metals may include, consist essentially of, or consist of Ti, V, Cr, Zr, Hf, Ru, Rh, Os, and/or Ir. Substantially all of the shaft (i.e., substantially the entire volume of the shaft) may be single-crystalline. The outer surface layer of the shaft may be disposed around a core that is not single-crystalline. The core may be, e.g., polycrystalline or amorphous. The core may include, consist essentially of, or consist of one or more of the one or more refractory metals. The core may include, consist essentially of, or consist of one or more refractory metals different from the one or more refractory metals of the outer surface layer. A thickness of the outer surface layer may be between approximately 100 μm and approximately 1500 μm. A corrosion-resistant coating may be disposed on at least a portion of the shaft (e.g., on substantially the entire outer surface layer of the shaft) and/or at least a portion of the base (e.g., on substantially the entire outer surface layer of the base). The corrosion-resistant coating may include, consist essentially of, or consist of MoSiB, MoZrO$_2$, and/or SiBC. A thickness of the corrosion-resistant coating may be between approximately 100 μm and approximately 500 μm. The shaft may define a hollow cooling channel therewithin.

In another aspect, embodiments of the invention feature a method of processing glass. A glass-melting furnace is provided. One or more glass melt electrodes protrude from an inner wall of the glass-melting furnace into an inner volume of the glass-melting furnace. Glass material is disposed within the inner volume of a glass-melting furnace. The glass material is melted at least in part by applying electrical current to the one or more glass melt electrodes. At least one glass melt electrode is at least partially immersed in the melted glass material. At least an outer surface layer of at least one of the glass melt electrodes is single-crystalline and includes, consists essentially of, or consists of one or more refractory metals. The one or more glass melt electrodes resist corrosion during the melting of the glass material.

Embodiments of the invention may include one or more of the following in any of a variety of combinations. The one or more refractory metals may include, consist essentially of, or consist of Mo and/or W. The one or more refractory metals may include, consist essentially of, or consist of Nb, Ta, and/or Re. The one or more refractory metals may include, consist essentially of, or consist of Ti, V, Cr, Zr, Hf, Ru, Rh, Os, and/or Ir. Substantially an entire volume of at least one glass melt electrode may be single-crystalline. The outer surface layer of at least one glass melt electrode may be disposed around a non-single-crystalline core. The core may be, e.g., polycrystalline or amorphous. The core may include, consist essentially of, or consist of one or more of the one or more refractory metals. The core may include, consist essentially of, or consist of one or more refractory metals different from the one or more refractory metals of the outer surface layer. A thickness of the outer surface layer may be between approximately 100 μm and approximately 1500 μm. A corrosion-resistant coating may be disposed on at least a portion of the shaft (e.g., on substantially the entire outer surface layer of the shaft) and/or at least a portion of the base (e.g., on substantially the entire outer surface layer of the base) of at least one glass melt electrode. The corrosion-resistant coating may include, consist essentially of, or consist of MoSiB, MoZrO$_2$, and/or SiBC. A thickness of the corrosion-resistant coating may be between approximately 100 μm and approximately 500 μm. At least one glass melt electrode may define a hollow cooling channel therewithin.

In yet another aspect, embodiments of the invention feature a glass melt electrode that includes, consists essentially of, or consists of a base sized and shaped for engagement with an interior surface of a glass-melting furnace, and an elongated shaft extending from the base. At least an outer surface layer of the shaft is composed of large crystalline grains each having a grain size larger than approximately 1 mm. At least the outer surface layer of the shaft includes, consists essentially of, or consists of one or more refractory metals.

Embodiments of the invention may include one or more of the following in any of a variety of combinations. At least an outer surface layer of the base may be composed of the large crystalline grains. The outer surface layer of the base may be disposed around a non-single-crystalline (e.g., polycrystalline or amorphous) core. The entire volume of the base may be composed of the large crystalline grains. The base may include, consist essentially of, or consist of one or more refractory metals that are the same as or different than the one or more refractory metals of the outer surface layer of the shaft. The base and the shaft may be portions of a seamless unitary structure. The one or more refractory metals may include, consist essentially of, or consist of Mo and/or W. The one or more refractory metals may include, consist essentially of, or consist of Nb, Ta, and/or Re. The one or more refractory metals may include, consist essentially of, or consist of Ti, V, Cr, Zr, Hf, Ru, Rh, Os, and/or Ir. Substantially all of the shaft (i.e., substantially the entire volume of the shaft) may be composed of the large crystalline grains. The outer surface layer of the shaft may be disposed around a core that is not composed of the large crystalline grains. The core may be, e.g., amorphous or polycrystalline with an average grain size smaller than the grain size of the large crystalline grains. The core may include, consist essentially of, or consist of one or more of the one or more refractory metals. The core may include, consist essentially of, or consist of one or more refractory metals different from the one or more refractory metals of the outer surface layer. A thickness of the outer surface layer may be between approximately 100 μm and approximately 1500 μm. A corrosion-resistant coating may be disposed on at least a portion of the shaft (e.g., on substantially the entire outer surface layer of the shaft) and/or at least a portion of the base (e.g., on substantially the entire outer surface layer of the base). The corrosion-resistant coating may include, consist essentially of, or consist of MoSiB, MoZrO$_2$, and/or SiBC. A thickness of the corrosion-resistant coating may be between approximately 100 μm and approximately 500 μm. The shaft may define a hollow cooling channel therewithin. The grain size of each of the large crystalline grains may be larger than approximately 5 mm, or even larger than approximately 10 mm.

In another aspect, embodiments of the invention feature a method of processing glass. A glass-melting furnace is provided. One or more glass melt electrodes protrude from an inner wall of the glass-melting furnace into an inner volume of the glass-melting furnace. Glass material is disposed within the inner volume of a glass-melting furnace. The glass material is melted at least in part by applying electrical current to the one or more glass melt electrodes. At least one glass melt electrode is at least partially immersed in the melted glass material. At least an outer surface layer of at least one of the glass melt electrodes (i) is composed of large crystalline grains each having a grain size larger than 1 mm, and (ii) includes, consists essentially of, or consists of one or more refractory metals. The one or more glass melt electrodes resist corrosion during the melting of the glass material.

Embodiments of the invention may include one or more of the following in any of a variety of combinations. The one or more refractory metals may include, consist essentially of, or consist of Mo and/or W. The one or more refractory metals may include, consist essentially of, or consist of Nb, Ta, and/or Re. The one or more refractory metals may include, consist essentially of, or consist of Ti, V, Cr, Zr, Hf, Ru, Rh, Os, and/or Ir. Substantially an entire volume of at least one glass melt electrode may be composed of the large crystalline grains. The outer surface layer of at least one glass melt electrode may be disposed around a non-single-crystalline core. The core may be, e.g., amorphous or polycrystalline with an average grain size smaller than the grain size of the large crystalline grains. The core may include, consist essentially of, or consist of one or more of the one or more refractory metals. The core may include, consist essentially of, or consist of one or more refractory metals different from the one or more refractory metals of the outer surface layer. A thickness of the outer surface layer may be between approximately 100 µm and approximately 1500 µm. A corrosion-resistant coating may be disposed on at least a portion of the shaft (e.g., on substantially the entire outer surface layer of the shaft) and/or at least a portion of the base (e.g., on substantially the entire outer surface layer of the base) of at least one glass melt electrode. The corrosion-resistant coating may include, consist essentially of, or consist of MoSiB, MoZrO$_2$, and/or SiBC. A thickness of the corrosion-resistant coating may be between approximately 100 µm and approximately 500 µm. At least one glass melt electrode may define a hollow cooling channel therewithin. The grain size of each of the large crystalline grains may be larger than approximately 5 mm, or even larger than approximately 10 mm.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
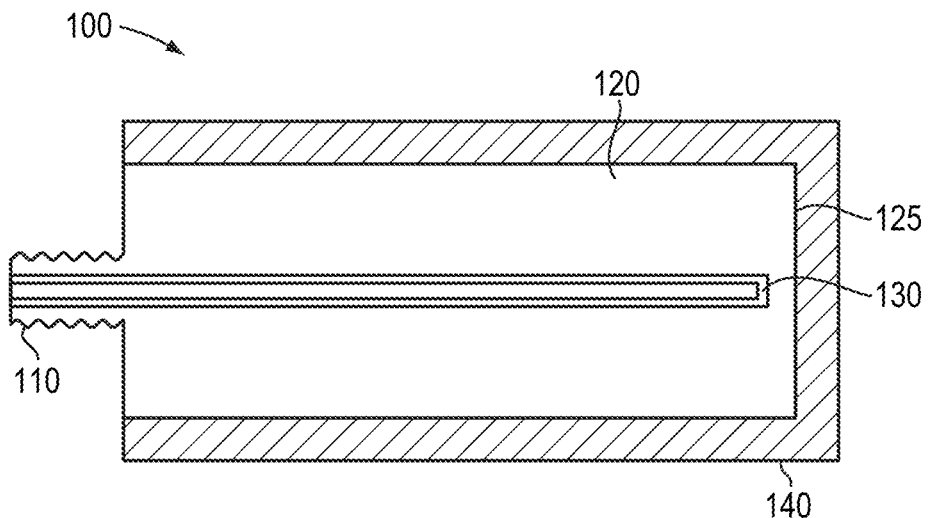
FIG. 1 is a schematic cross-section of a glass melt electrode in accordance with various embodiments of the invention.

FIG. 1 depicts a glass melt electrode 100 in accordance with various embodiments of the present invention. As shown, glass melt electrode 100 includes a base 110 that is sized and shaped for attachment within a glass-melting furnace (e.g., engagement on an interior wall or bottom surface thereof), where it electrically connects to a power source. In exemplary embodiments, the base 110 is threaded and/or tapered, and/or has a diameter (or lateral dimension such as a width) different (e.g., smaller) than the diameter (or lateral dimension such as a width) of the shaft of the electrode. Extending from the base is a shaft 120, at least a portion of which may be substantially cylindrical. The end 125 of the shaft 120 opposite the base may be substantially flat, as shown, or may be rounded. In some embodiments, the end 125 is roughly teardrop-shaped, as detailed in U.S. Pat. No. 8,743,926, filed on Aug. 10, 2010 (the '926 patent), the entire disclosure of which is incorporated by reference herein. The electrode 110 may be a single, unified part or may include or consist essentially of multiple parts that fit together. For example, multiple sections may be threaded to engage with and attach to each other. For example, the base 110 and/or a section of the shaft 125 including the end 125 may be a discrete piece attachable and detachable from the remaining portion(s) of the electrode 100. In various embodiments of the invention, the shaft 120 (and, in some embodiments, the base 110) includes, consists essentially of, or consists of at least one single-crystalline refractory metal, e.g., Nb, Ta, Re, Mo, and/or W. In various embodiments of the invention, the shaft 120 (and, in some embodiments, the base 110) includes, consists essentially of, or consists of at least one high-melting-temperature metal (e.g., a metal having a melting point higher than approximately 1850° C.), e.g., Ti, V, Cr, Zr, Hf, Ru, Rh, Os, and/or Ir. In various embodiments of the invention, the shaft 120 (and, in some embodiments, the base 110) includes, consists essentially of, or consists of an alloy or mixture of two or more refractory metals and/or high-melting-temperature metals listed above. The lack of grain boundaries within the shaft 120 beneficially retards or substantially eliminates corrosion due to attack by corrosive elements within the glass melt in which the shaft 120 is immersed during use.

The shaft 120 of the electrode 100 may incorporate a cooling channel 130 therewithin, as described in the '926 patent. Water or another coolant (e.g., a liquid or a gas) may be flowed through the cooling channel 130 to maintain the electrode 100 at a lower temperature during the glass-melting operation. In addition, all or a portion of the electrode 100 (including, in some embodiments, the base 110) may have a corrosion-resistant coating 140 thereon. The coating 140 may retard or substantially eliminate bulk oxidation and/or corrosion of the electrode 100 via interaction between corrosive elements in the bath of molten glass and the material of the shaft 120. The coating 140 may include, consist essentially of, or consist of, for example, MoSiB, $MoZrO_2$, or SiBC. The coating 140 may have a thickness between, for example, approximately 100 µm and approximately 500 µm. The coating may be applied to all or part of the electrode 100 by, e.g., sputtering, plasma spray, cold spray, and/or chemical-vapor deposition.

Figure 2:
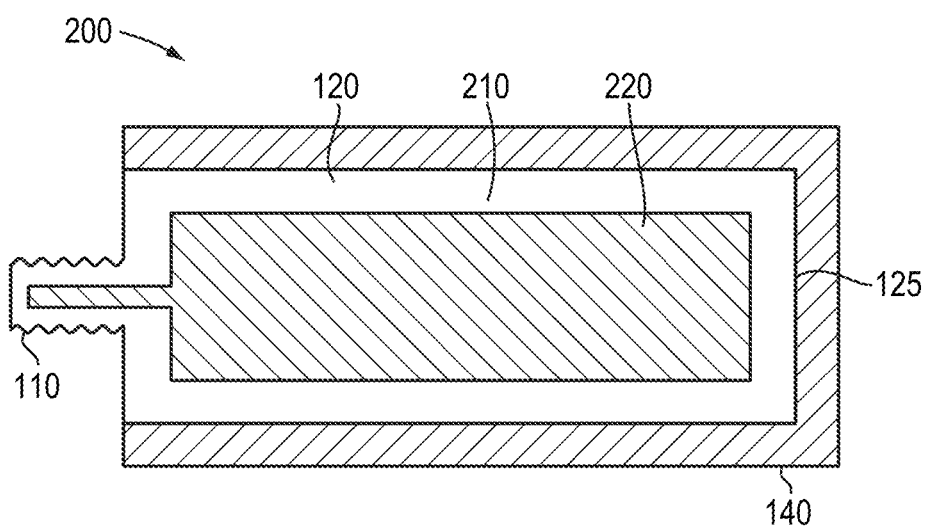
FIG. 2 is a schematic cross-section of a glass melt electrode in accordance with various embodiments of the invention.

FIG. 2 depicts a glass melt electrode 200 in accordance with various embodiments of the present invention. Glass melt electrode 200 is similar to glass melt electrode 100 but is not composed entirely of single-crystalline material. Instead, electrode 200 features an outer surface layer 210 that is single-crystalline and that surrounds a polycrystalline (or, in some embodiments, substantially amorphous) core 220. The thickness of the outer surface layer 210 is generally sufficiently thick to retard or sufficiently prevent the diffusion of corrosive elements from the glass melt into the core 220, which is more susceptible to corrosion due to the presence of grain boundaries (or a generally more disordered interatomic structure) therein. For example, the outer surface layer 210 may have a thickness between approximately 100 µm and approximately 1500 µm. The polycrystalline core 220 may provide the electrode 200 with enhanced resistance to creep deformation due to the network of grain boundaries (or other atomic-level disorder) therewithin, particularly at the high temperatures within the glass-melting furnace during operation. Like the shaft 120 of electrode 100, the outer surface layer 210 of electrode 200 may include, consist essentially of, or consist of a single-crystalline refractory metal, e.g., Nb, Ta, Re, Mo, and/or W. In various embodiments of the invention, the surface layer 210 includes, consists essentially of, or consists of at least one high-melting-temperature metal, e.g., Ti, V, Cr, Zr, Hf, Ru, Rh, Os, and/or Ir. The core 220 may include, consist essentially of, or consist of a polycrystalline and/or amorphous material (e.g., one or more metals), preferably (but not necessarily) the same material of which the outer surface layer 210 is composed. For example, the core 220 may include, consist essentially of, or consist of Nb, Ta, Re, Mo, W, Ti, V, Cr, Zr, Hf, Ru, Rh, Os, and/or Ir. The electrode 200 may also incorporate a cooling channel 130 (not shown in FIG. 2 for clarity) as described above and illustrated in FIG. 1.

In additional embodiments of the present invention, electrode 100 or outer surface layer 210 is composed of a plurality of large grains, i.e., grains each having a grain size of at least 1 mm, at least 5 mm, or even at least 10 mm. The large grain size vastly reduces the grain-boundary density in at least the outer surface layer of the electrodes, thereby substantially reducing any corrosion therealong. In embodiments in which outer surface layer 210 of electrode 200 is composed of large grains, the core 220 may include, consist essentially of, or consist of amorphous material or polycrystalline material having a grain size smaller (e.g., at least 10 times smaller) than that of surface layer 210.

The glass melt electrodes in accordance with embodiments of the present invention may be advantageously utilized to melt glass (for example, in a glass-melting furnace) while resisting corrosion from the bath of molten glass in which the electrodes are partially or completely immersed. The electrodes may be utilized with any of a variety of different types of glass, e.g., soda-lime glass and/or borosilicate glass.

Glass melt electrodes in accordance with embodiments of the present invention may be fabricated by any of a variety of different techniques. In some embodiments, the electrode is initially fabricated as a polycrystalline structure via, e.g., powder metallurgy techniques (e.g., pressing and sintering, hot-isostatic pressing, cold-isostatic pressing, etc.) or casting, and then processed such that the outer surface layer (and, in some embodiments, at least the entire shaft) of the electrode is single crystalline or composed of few large grains. For example, techniques such as zone melting and/or static or dynamic abnormal grain-growth techniques (utilizing, e.g., cyclic annealing treatments) may be utilized to promote formation of a few grains or a single grain in at least the outer surface layer, thereby reducing or substantially eliminating grain boundaries therewithin. In other embodiments, the electrode may be initially fabricated as a single-crystalline body utilizing techniques such as investment casting.

For example, electrodes in accordance with embodiments of the invention may be fabricated utilizing a process that includes a floating-zone process (i.e., zone melting). In such a process, a polycrystalline or amorphous Mo rod (fabricated by, e.g., powder metallurgy techniques or casting) is disposed within a vacuum furnace. A single crystal seed (which may include, consist essentially of, or consist of, e.g., Mo) is attached to one end of the Mo rod, and then a small portion of the rod proximate the seed is heated using, for example, induction heating or radiation heating (e.g., using an induction coil or a resistance heater). The furnace is evacuated or purged with an inert gas. The applied heat forms a narrow molten zone, and then the heating apparatus is moved (or, equivalently, the rod is translated relative to the heating apparatus) along the length of the rod. Within the molten zone, single-crystal Mo nucleates from the seed, and the relative movement of the heating apparatus and the rod causes the single-crystal Mo region to grow along the length of the Mo rod while "consuming" the polycrystalline or amorphous portion of the rod. In various embodiments, the interior portion of the rod may be maintained polycrystalline or amorphous by, e.g., melting only the outer portion of the Mo rod and/or utilizing a Mo seed that has a polycrystalline or amorphous center region surrounded by a single-crystalline outer region.

Electrodes in accordance with embodiments of the present invention may also be fabricated via "needle-eye" zone melting that enables fabrication of electrodes having a larger diameter than the heating coil. Like the zone melting process detailed above, a heating coil is translated relative to an electrode to locally melt and reform the electrode as a single crystal. In the needle-eye process, most of the initial polycrystalline or amorphous rod has a diameter larger than the opening in the heating coil, but one end of the rod tapers down to a diameter smaller than the opening. The single-crystal seed is affixed to this tapered end of the rod, and the heating coil slides over the seeded end. As the heating coil is translated relative to the rod (i.e., with the coil and/or rod actually being moved), the molten zone within the heating coil has the smaller diameter (i.e., smaller than the coil opening), while the processed portion of the rod expands in diameter during the re-solidification process and has a final diameter larger than that of the molten zone (e.g., approximately equal to the larger diameter of the unprocessed rod). Exemplary electrodes fabricated by this process may have diameters up to 3-4 inches, or even larger.

In other embodiments, electrodes in accordance with embodiments of the present invention may be fabricated utilizing, at least in part, static or dynamic abnormal grain-growth techniques. In both techniques, a polycrystalline Mo rod produced by, e.g., powder metallurgy techniques (e.g., pressing and sintering Mo powder) or arc casting, is heated to a high temperature to trigger the abnormal grain growth of a single grain or of a few grains. In various embodiments, before the high-temperature treatment, the polycrystalline Mo rod may be mechanically deformed by, for example, a minimum of 75% RA (reduction in cross-sectional area). During the heat treatment, one or a few grains expand in volume at the expense of the other grains in the rod (which are consumed or vastly reduced in size) until substantially all (or a substantial portion) of the rod is single-crystalline or composed of a few large grains. In dynamic abnormal grain growth, the Mo rod is also placed under tensile stress to initiate the grain growth, while static abnormal grain growth does not utilize added stress.

In an exemplary static abnormal grain growth process, a Mo billet may be produced by, for example, pressing and sintering of Mo powder. The Mo powder may also be blended with a small amount (e.g., approximately 10 ppm to approximately 50 ppm) of an oxide powder (e.g., CaO or MgO). After sintering of the billet, the billet may be rolled or otherwise worked at an elevated temperature (e.g., approximately 1000° C.) into a rod. The rod may then be heated to an even higher temperature. For example, the nominal annealing temperature may be approximately 2000° C., or even higher. The rod may be heated for, e.g., approximately 1 hour, or even longer. The abnormal grain growth will be triggered at a point along the length of the rod, and the single grain or few grains will grow along the length of the rod. If the entire rod does not end up as a single crystal (e.g., if one or both ends still contain multiple crystalline grains), then any polycrystalline portions of the rod may be cut away to produce a single-crystalline electrode in accordance with embodiments of the present invention.

In an exemplary dynamic abnormal grain growth process, a substantially pure Mo rod may be produced by, for example, arc melting or powder metallurgy techniques. In various embodiments, the polycrystalline Mo rod may be mechanically deformed by, for example, a minimum of 75% RA. The rod may be fixtured (i.e., attached at both ends) in an apparatus (e.g., a tensile-test apparatus) that puts the rod in a state of tensile strain by pulling one or both ends. The rod is heated during the pulling to, for example, a temperature greater than approximately 1400° C. (e.g., between approximately 1400° C. and approximately 2200° C.). The rod is slowly pulled at, for example, a constant true-strain rate less than approximately $10^{-4}$ s$^{-1}$. During the heating and pulling, the abnormal grain growth will be triggered, signified by a fairly large load drop detectable by the pulling apparatus. Once that load begins to again increase, the dynamic abnormal grain growth process is substantially complete. As with the static technique described above, if the entire rod does not end up as a single crystal, then any polycrystalline portions of the rod may be cut away to produce a single-crystalline electrode in accordance with embodiments of the present invention.

Example 1

A corrosion test was performed on three different electrodes. Electrode #1 was a conventional polycrystalline Mo glass melt electrode, Electrode #2 was a conventional polycrystalline Mo glass melt electrode with a corrosion-resistant coating (MoSiB) thereon, and Electrode #3 was a single-crystalline Mo glass melt electrode with a corrosion-resistant coating (MoSiB) thereon in accordance with embodiments of the present invention. Each of the electrodes was cylindrical and had a length of 5.25 inches and a diameter of 0.625 inches. The electrodes were immersed in molten soda-lime glass ($SiO_2$—$Na_2O$—$CaO$—$MgO$—$Al_2O_3$—$Fe_2O_3$—$K_2O$) at 1100° C., with alternating current flowing through the electrodes, for a period of 100 hours. Electrodes #1 and #2 had grain sizes ranging from approximately 30 microns to approximately 100 microns.

Figure 3:
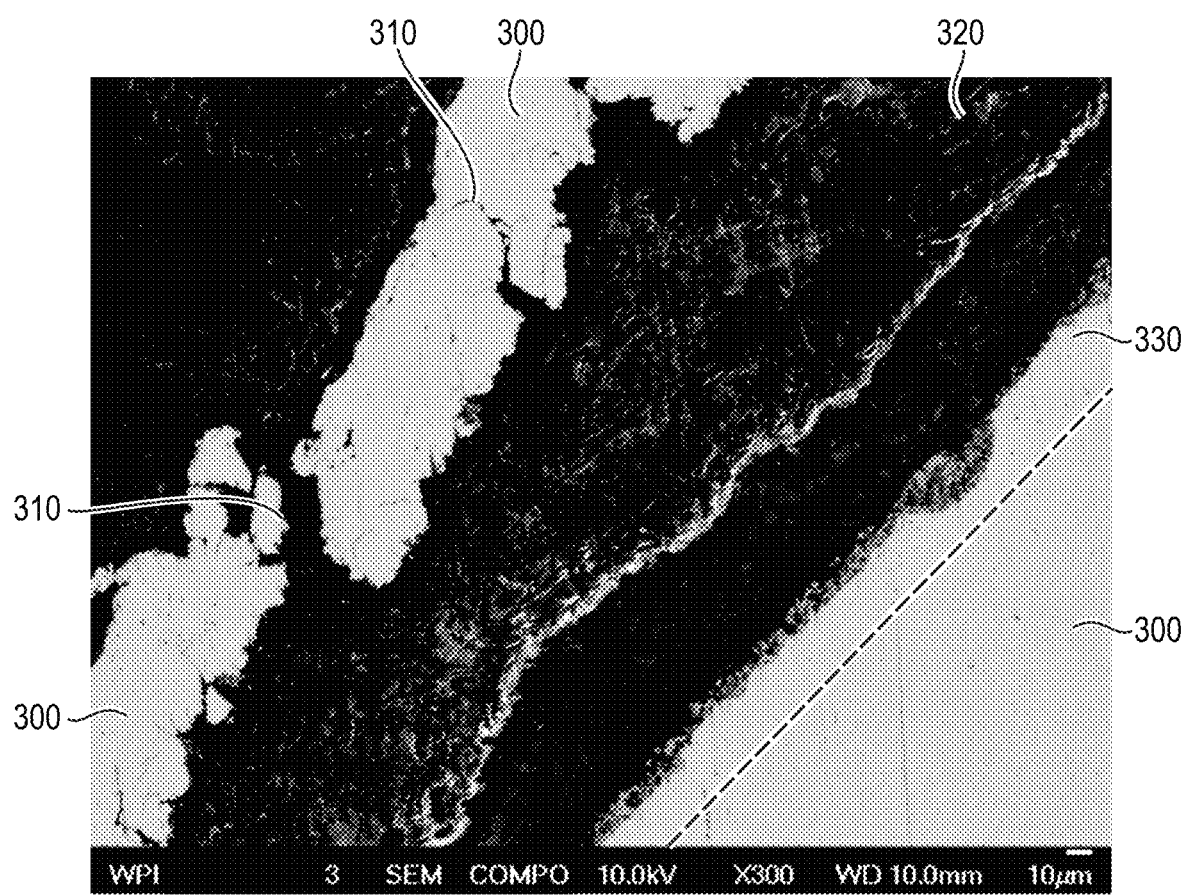
FIG. 3 is a micrograph depicting a portion of a polycrystalline glass melt electrode after a corrosion test.

FIG. 3 is a scanning electron microscopy (SEM) micrograph showing the results for Electrode #1. The micrograph depicts a region near the surface of the electrode (designated as electrode 300). As shown, the molten glass penetrated into the electrode 300 via grain boundaries 310, forming large glass regions 320 within the bulk of the electrode 300 and resulting in the detachment of fairly large portions of the electrode 300. In addition, an oxidized layer 330 including or consisting essentially of $MoO_2$ was formed between the glass-containing region 320 and the inner portion of the Mo electrode 300 due to bulk oxidation enabled by the lack of any corrosion-resistant coating on the surface of the electrode.

Figure 4A:
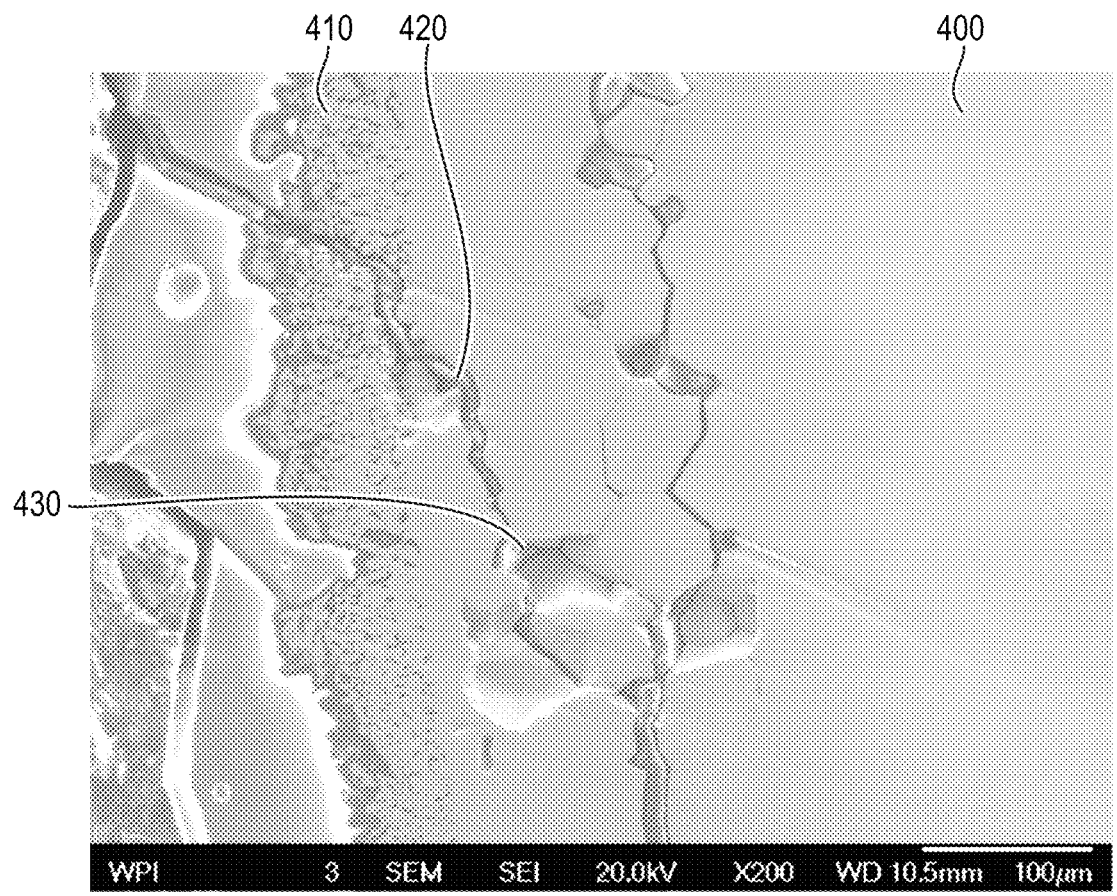
FIGS. 4A and 4B are micrographs depicting portions of a coated polycrystalline glass melt electrode after a corrosion test.
Figure 4B:
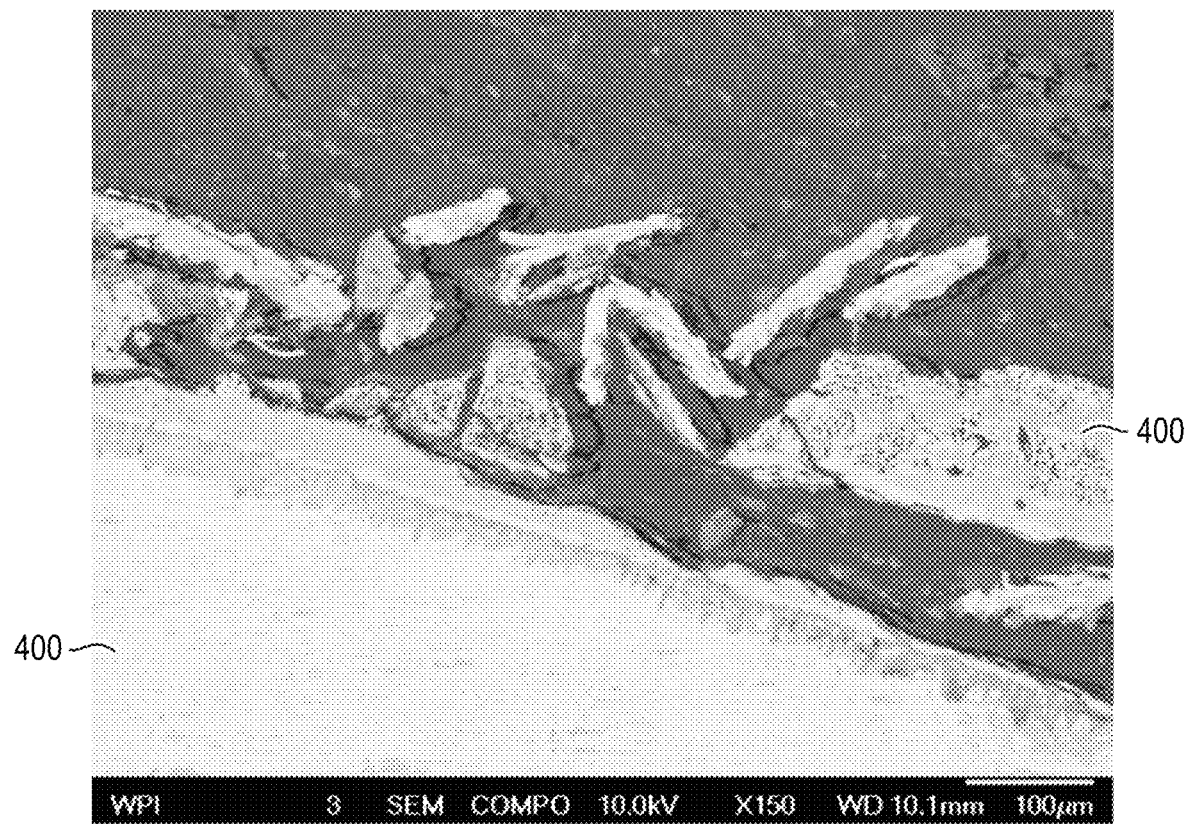

FIG. 4A is an SEM micrograph showing the results for Electrode #2. Due to the presence of the corrosion-resistant coating, little or no oxidized layer is formed on Electrode #2 (designated as electrode 400 having corrosion-resistant coating 410 thereon). However, corrosive elements from the glass melt have penetrated through the coating 410 and diffused along grain boundaries 420 of the electrode 400, resulting in corrosion within the bulk of the electrode and glass-containing regions 430. This grain-boundary corrosion can lead to delamination and loss of the coating, as shown in the SEM micrograph of FIG. 4B.

Figure 5:
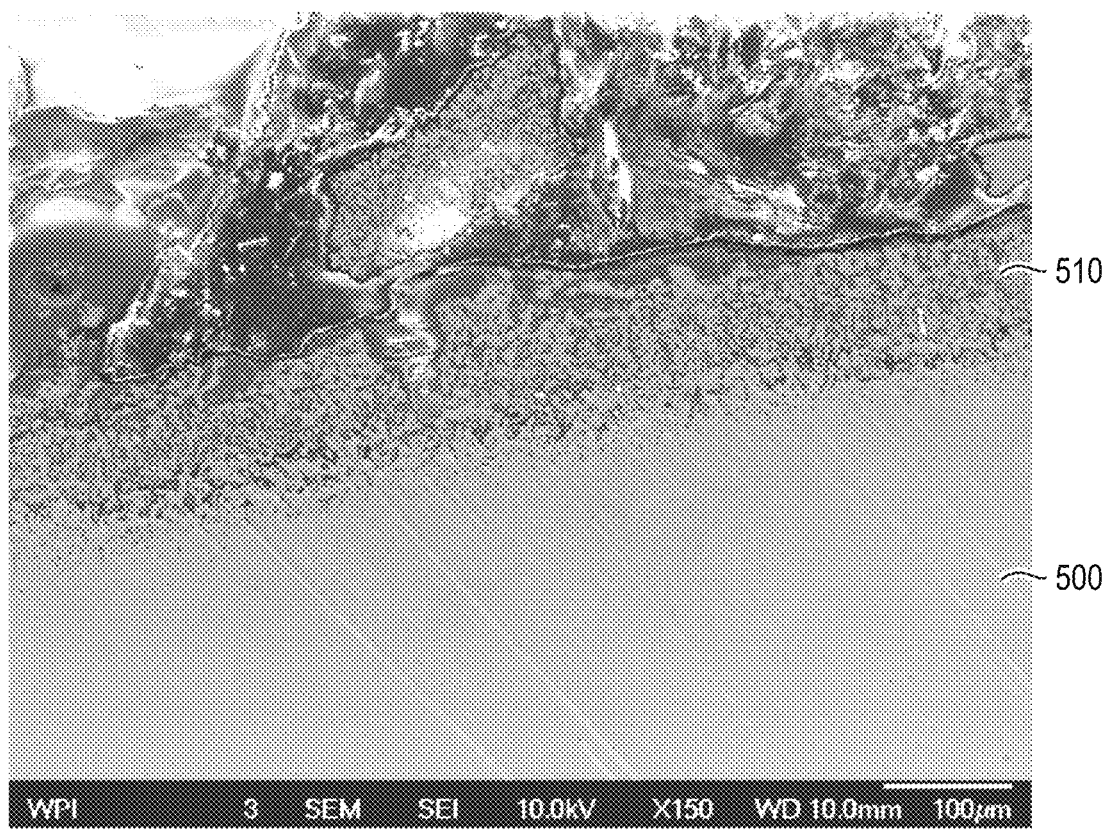
FIG. 5 is a micrograph depicting a portion of a coated single-crystalline glass melt electrode in accordance with various embodiments of the invention after a corrosion test.

FIG. 5 is an SEM micrograph showing the results for Electrode #3 (designated as electrode 500 having corrosion-resistant coating 510 thereon). As shown, the corrosion-resistant coating 510 has been subjected to attack by the molten glass, but no corrosive elements from the glass have penetrated through the coating 510 and into the single-crystalline surface layer of the electrode 500, thus improving the lifetime of the coating 510 and of the electrode 500 itself.

Example 2

Figure 6:
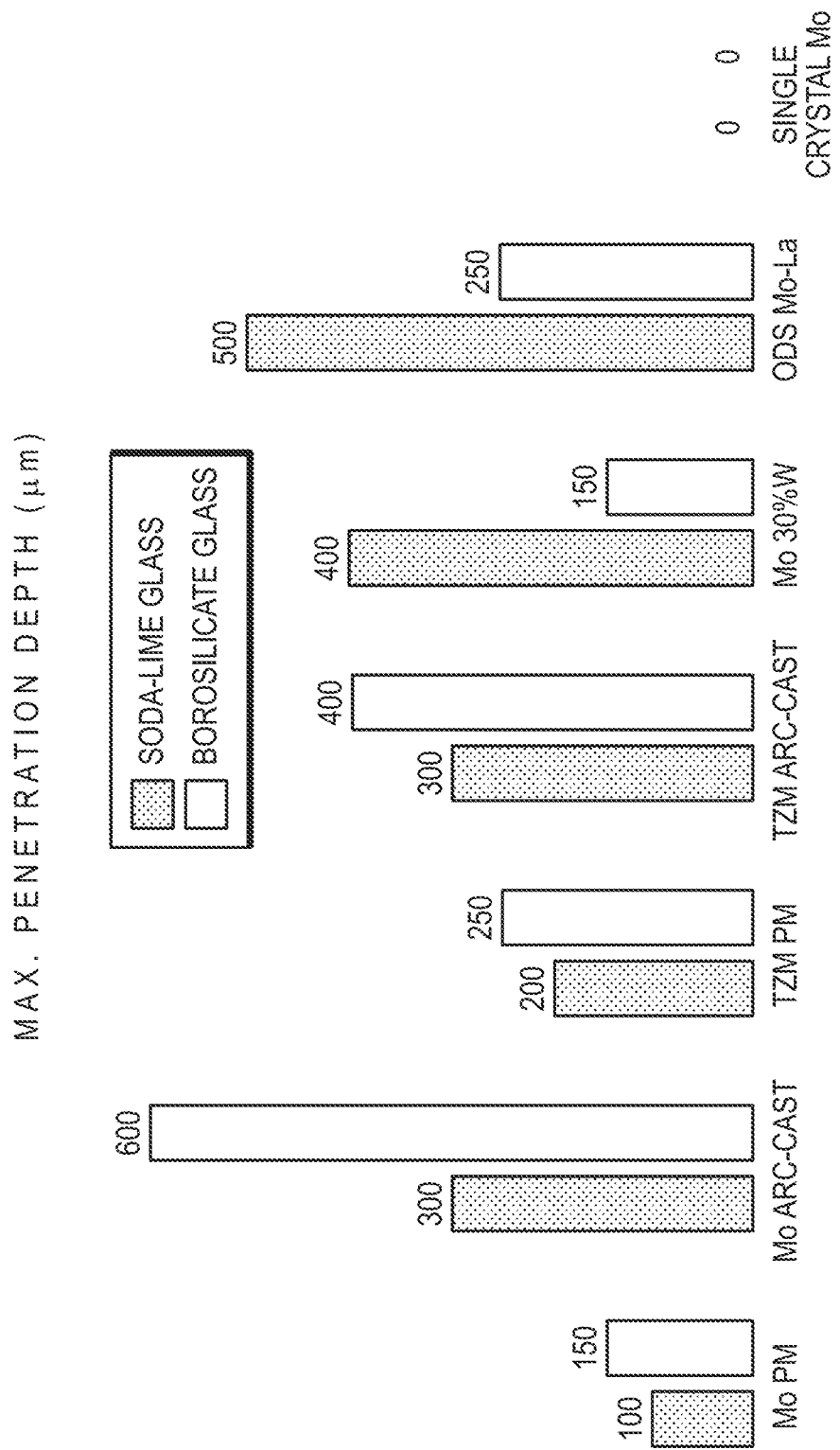
FIG. 6 is a graph comparing results of two corrosion tests on a variety of polycrystalline glass melt electrodes and a single-crystal glass melt electrode in accordance with various embodiments of the invention.

Two corrosion tests were performed on several different electrodes. Each of the electrodes was cylindrical and had a length of 5.25 inches and a diameter of 0.625 inches. In the first test, the electrodes were immersed in molten soda-lime glass ($SiO_2$—$Na_2O$—$CaO$—$MgO$—$Al_2O_3$—$Fe_2O_3$—$K_2O$) at 1200° C. for a period of 12 days. In the second test, the electrodes were immersed in molten borosilicate glass ($SiO_2$—$CaO$—$Al_2O_3$—$MgO$—$B_2O_3$—$Na_2O$—$F$—$TiO_2$—$Fe_2O_3$) at 1300° C. for a period of 12 days. After each test, the depth within each electrode of maximum penetration of glass constituents was measured. FIG. 6 is a graph of the results of the tests for, from left to right, (1) polycrystalline Mo electrodes fabricated by powder metallurgy (e.g., pressing and sintering of Mo powder), (2) polycrystalline arc-cast Mo electrodes, (3) polycrystalline powder-metallurgy electrodes composed of a TZM alloy (i.e., a titanium (Ti)-zirconium (Zr)—Mo alloy, in this case approximately 0.5% Ti, 0.1% Zr, and the balance Mo), (4) polycrystalline arc-cast electrodes composed of the TZM alloy, (5) polycrystalline electrodes composed of an alloy of Mo with 30% W, (6) polycrystalline electrodes composed of oxide-dispersion-strengthened (ODS) Mo-lanthanum (La) alloy (i.e., Mo containing a dispersion of lanthanum oxide particles (present at, e.g., 0.3%-1.1% by weight)), and (7) single-crystal Mo in accordance with embodiments of the present invention. As shown in FIG. 6, the single-crystal Mo electrodes exhibited no detectable penetration of the components of the glass melts, while all of the other samples, which had grain sizes ranging from approximately 30 microns to approximately 100 microns, exhibited between 100 µm and 600 µm of penetration. These results emphasize the superior performance and lifetime of single-crystalline electrodes in accordance with embodiments of the invention, due at least in part to the absence of grain boundaries at least at exposed surfaces thereof.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A glass melt electrode comprising:
a base sized and shaped for engagement with an interior surface of a glass-melting furnace; and
an elongated shaft extending from the base,
wherein at least an outer surface layer of the shaft is single-crystalline and comprises one or more refractory metals.

2. The glass melt electrode of claim 1, wherein the one or more refractory metals comprise at least one of Mo or W.

3. The glass melt electrode of claim 1, wherein the one or more refractory metals comprise at least one of Nb, Ta, or Re.

4. The glass melt electrode of claim 1, wherein the one or more refractory metals comprise at least one of Ti, V, Cr, Zr, Hf, Ru, Rh, Os, or Ir.

5. The glass melt electrode of claim 1, wherein substantially all of the shaft is single-crystalline.

6. The glass melt electrode of claim 1, wherein the outer surface layer of the shaft is disposed around a polycrystalline core.

7. The glass melt electrode of claim 6, wherein the core comprises the one or more refractory metals.

8. The glass melt electrode of claim 1, further comprising a corrosion-resistant coating disposed on at least a portion of the shaft.

9. The glass melt electrode of claim 8, wherein a thickness of the corrosion-resistant coating is between approximately 100 µm and approximately 500 µm.

10. The glass melt electrode of claim 1, wherein the shaft defines a hollow cooling channel therewithin.

11. The glass melt electrode of claim 1, wherein (i) the shaft extends from the base to a terminal end, and (ii) a diameter of the shaft, from the base to the terminal end, is substantially constant.

12. The glass melt electrode of claim 1, wherein the shaft extends from the base to a flat terminal end.

13. A method of processing glass, the method comprising:
providing a glass-melting furnace, wherein one or more glass melt electrodes protrude from an inner wall of the glass-melting furnace into an inner volume of the glass-melting furnace;
disposing glass material within the inner volume of a glass-melting furnace; and
melting the glass material at least in part by applying electrical current to the one or more glass melt electrodes, each glass melt electrode being at least partially immersed in the melted glass material,
wherein at least an outer surface layer of each of the glass melt electrodes is single-crystalline and comprises one or more refractory metals, the one or more glass melt electrodes resisting corrosion during the melting of the glass material.

14. The method of claim 13, wherein the one or more refractory metals comprise at least one of Mo or W.

15. The method of claim 13, wherein the one or more refractory metals comprise at least one of Nb, Ta, or Re.

16. The method of claim 13, wherein the one or more refractory metals comprise at least one of Ti, V, Cr, Zr, Hf, Ru, Rh, Os, or Ir.

17. The method of claim 13, wherein substantially an entire volume of at least one glass melt electrode is single-crystalline.

18. The method of claim 13, wherein the outer surface layer of at least one glass melt electrode is disposed around a polycrystalline core.

19. The method of claim 18, wherein the core comprises the one or more refractory metals.

20. The method of claim 13, wherein at least one glass melt electrode defines a hollow cooling channel therewithin.

* * * * *